Patented Nov. 11, 1952

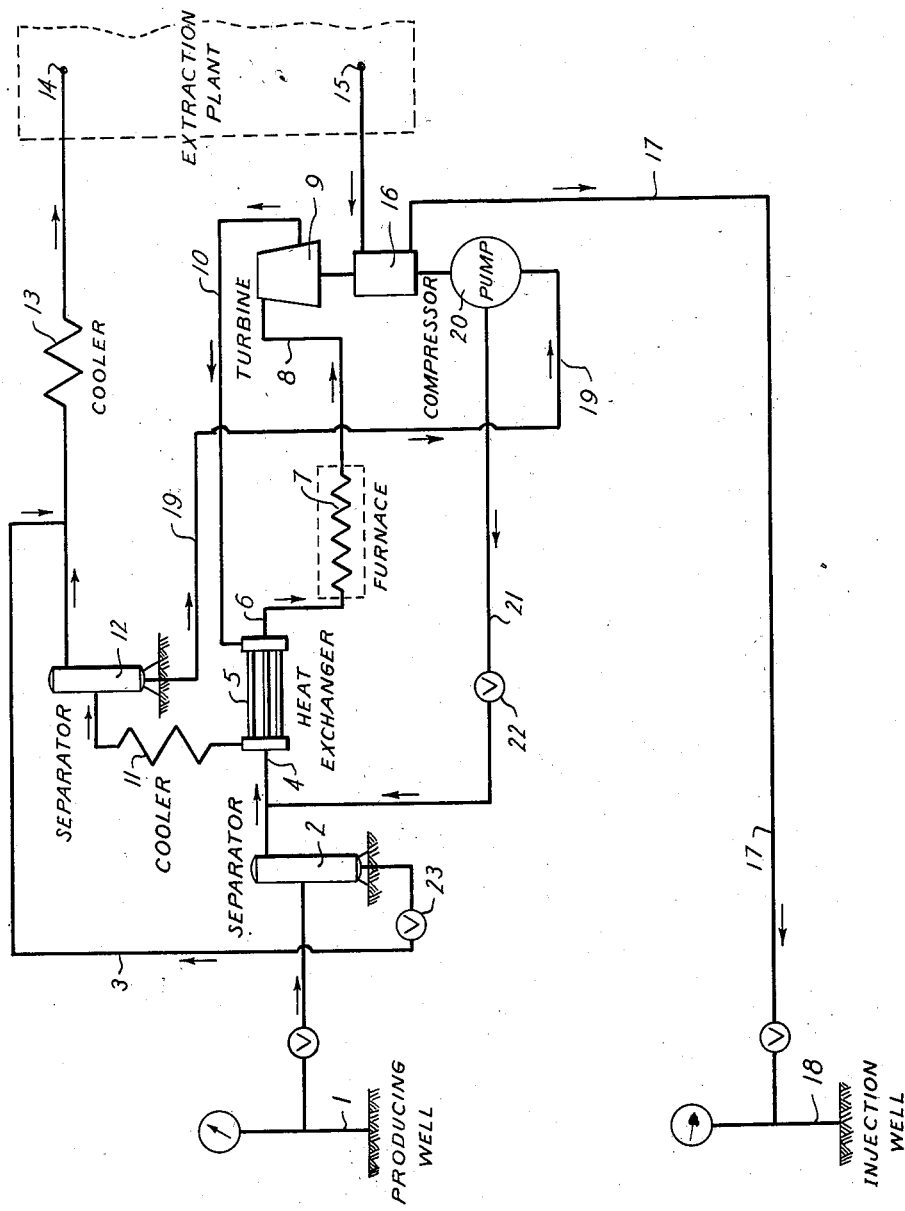

2,617,484

UNITED STATES PATENT OFFICE 2,617,484

TREATMENT OF GASEOUS MIXTURES

Judson S. Swearingen, San Antonio, Tex.

Application November 14, 1949, Serial No. 127,069

11 Claims. (Cl. 166—1)

This invention relates to the processing of natural gaseous mixtures and has for its general object the provision of an improved method of and apparatus for effecting the pressure changes in pertinent processes.

More particularly this invention has to do with the processing of natural gases in such a way that desirable constituents may be recovered from such natural gases and the lean residual gas returned to some remote point in the producing formation for the purpose of sweeping the rich gas into the producing well, for pressure maintenance in the formation, and for other well-known purposes. This process is commonly called cycling.

In the conventional cycling process the rich condensate-laden gas is withdrawn from the producing well or wells, subjected to some treatment for the recovery of the desired condensibles such as by contact at reduced pressure with a suitable absorbent which leaves a lean residue gas, and the residue gas is compressed by internal combustion engine-driven compressors and injected back into the producing formation through suitably located injection well or wells.

In such previously known methods the gas has ordinarily been processed at as high a pressure as possible so as to minimize the power required to force the lean residue gas back into the producing formation, although lower pressures frequently favor the liquid recovery process.

The general compression problem in cycling is one of compressing the denuded residue gas, the volume of which is of the order of 95 per cent of the rich produced gas, from the liquid recovery plant pressure, which is of the order of 1200 p. s. i. or higher, to a pressure sufficient to inject it back into injection wells into the producing formation. This injection pressure is of the order of 3000 p. s. i. This injection pressure is necessarily higher than the shut-in well-head pressure because of pressure drops in the pipe line from the compressor to the injection well, in the injection well pipe, and in the gas-bearing formation immediately surrounding the well bore. Similarly the pressure of the produced gas as it reaches the liquid recovery plant is lower than the shut-in well-head pressure, and is of the order of 2000 p. s. i. or lower. The liquid recovery plant operating pressure can be reduced to advantage. Hence a typical job would consist of dropping the pressure of the rich produced gas from 2000 p. s. i. or lower to 1000 p. s. i., then compressing the lean residue gas which is about 95 per cent of this volume from 1000 p. s. i. to 3000 p. s. i.

It has been proposed to utilize the energy of expansion for assisting the recompression and to add to such energy by heating the gas before expansion. As applied to the above-stated simplified problem the 2000 p. s. i. incoming gas would under such proposal be heated to increase its volume, then expanded in a turbine to 1000 p. s. i., then cooled and 95 per cent of it recompressed in a compressor driven by the turbine from 1000 p. s. i. to 3000 p. s. i.

There is an upper limit to which the incoming gas can be heated, partly because of the limitations of materials of construction and mainly because the gas would be thermally decomposed. Thus the thermal expansion potentialities of the incoming gas stream are such that an optimistic estimate of the energy from this source put into the residue gas stream as compression energy would compress the latter stream only to the 2000 p. s. i. incoming pressure and would fall 1000 p. s. i. short of that required to inject it back into the formation. Furthermore, in actual practice the 2000 p. s. i. production pressure is on the optimistic side and if this is actually only slightly lower, any practicality of this heretofore proposed method will be nonexistent.

In this invention, it is proposed to obtain the additional necessary compression energy by combining with this operation a power-producing cycle of the liquid contained in the produced gas. By this method an unlimited additional amount of power may be obtained. More complicated machines are not required because the streams are combined and the same turbine used. In fact, the turbine design is simplified. The recovery of the liquid in this power-producing cycle is easy because the pressures are in the retrograde range, also this liquid has unusual expansion and therefore power-producing potentialties because it contains a large amount of dissolved gas.

It is an object of this invention to provide a method and apparatus whereby a liquid-laden high pressure gaseous mixture may be expanded to a relatively low pressure favorable for processing and the residue gas then recompressed to a high pressure for disposition, all more economically than now possible with hitherto known apparatus and methods.

Another object of this invention is to provide such a method by which simple, small-size, practically non-vibrating rotating equipment is substituted for the expensive reciprocating equipment which is subject to objectionable vibrations.

Still another object of this invention is to provide a cheaper apparatus than hitherto employed for extracting desired constituents from a gaseous mixture and returning the residue gas at a higher pressure than that of the original mixture.

Another object of this invention is to provide a method and apparatus which will make possible the processing of a gaseous mixture at a pressure substantially less than that of the incoming pressure, without the necessity for the additional prime mover capacity for recompression of the gas to or above incoming pressure which is necessary with presently known methods and apparatus.

Yet another object is to provide a method whereby the power obtained from the expansion of natural gas may be augmented in connection with such expansion to such an extent that the gas after expansion may be recompressed to any desired pressure by power obtained from and in connection with its expansion.

Other objects and advantages of this invention will become apparent from the following description taken in connection with the accompanying drawings wherein is set forth by way of illustration one embodiment of this invention.

In the drawings the single figure illustrates a flow diagram of a process and apparatus according to the present invention.

Referring more specifically to the flow diagram, the gaseous mixture to be treated will be produced from a producing well 1 in the usual manner and will be conducted by means of a suitable pipe line to a separator 2 located preferably adjacent the entrance to the plant. At its entrance into the separator 2 let it be assumed that the gaseous mixture is at a pressure of 2000 p. s. i. and a temperature of 125° F.

In the separator 2, there is removed from the mixture any salt water or high boiling point constituents that might leave a solid deposit in or otherwise injure the other apparatus through which the mixture will be passed. Thus the separator 2 performs the function of providing a substantially purified hydrocarbon mixture to the apparatus arranged in accordance with this invention as will now be described.

Upon emerging from the separator 2 the gaseous mixture has injected into it by pump 20 which is indicated as being powered by gas turbine 9 a stream of liquid hydrocarbons from any suitable source preferably as hereinafter described, so as to give the composite mixture a greater potential than the original gaseous mixture for expansion upon being heated, and to provide a gaseous mixture of higher density after vaporization. This composite mixture is conducted through a pipe line 4 to a heat exchanger 5 where it takes up heat from a later expanded phase of the same stream of gaseous mixture which is then further on its way toward the absorption or other suitable extraction plant.

Upon emerging from the heat exchanger 5 at the point 6, it will be assumed that the gaseous mixture is still at a pressure not greatly lower than that at which it entered the plant, but that it has attained a temperature of, for example, 580° F., so that its volume has been substantially increased. It is then passed through a heater 7 which is illustrated diagrammatically in the drawing and which may be a direct fired tube-still heater or furnace. In this furnace it will be assumed that unlimited heat is available and that any desired amount of heat may be added to the gaseous mixture causing it to still further increase its volume without substantially changing its pressure, and that the gaseous mixture will emerge from the furnace at some temperature which will be kept fairly constant and preferably of the order of 750° F.

The heated gaseous mixture at a pressure of let us say 1950 p. s. i., is then conducted through a line 8 to a gas turbine 9 in which it is permitted to expand to a pressure in the neighborhood of 1050 p. s. i. The turbine 9 may be in the form of any suitable type of expansion engine, but the turbine type is preferred because of its efficiency, its comparative freedom from vibration in operation and the small number of its moving parts, as well as its lightness for a given horsepower output. Upon emerging from the turbine 9, the gaseous mixture will still be at a relatively high temperature such as, for example, 680° F., and will be conducted directly to the heat exchanger 5, where it will be caused to give up a substantial portion of its heat content to the cool composite mixture coming into the heat exchanger as hereinbefore described. The gaseous mixture and any entrained liquid leaving the heat exchanger 5 may be at a temperature of say 225° F. and may be caused to pass through a cooler 11 and then a separator 12 where a quantity of high vapor pressure liquid hydrocarbon mixture may be withdrawn for reinjection by means of a liquid pump into the high pressure gaseous mixture entering the heat exchanger 5 as hereinafter more fully set forth. Such liquid ordinarily will consist not only of fractions of higher boiling point in liquid form but also of a certain portion of other fractions of lower boiling point in solution therein.

Upon leaving separator 12 the gaseous mixture will be conducted through the cooler 13 in which its temperature may be reduced to, for example, 95° F. It will then enter the absorption or other extraction plant at the point 14, at a pressure of, for example, 1000 p. s. i.

In the absorption or other extraction plant the desirable constituents of the gaseous mixture will be removed and the residue gas, which is usually made up of the lighter constituents of the original gaseous mixture, will emerge from the absorption plant at some point such as 15, at which point it will be slightly warmer, say for example 100° F., and at a pressure of perhaps 980 p. s. i. The range of pressures referred to in the neighborhood of 1000 p. s. i. have been found to be much more economical and desirable for carrying out the absorption process of extracting the desirable constituents of the gaseous mixture, than are relatively higher pressures such as those in the neighborhood of 2000 p. s. i., now employed in many cases in order to minimize the power required for recompressing the gaseous residue to reinject it into the formation.

The residue gas delivered from the extraction plant at the point 15 is conducted to a compressor 16 which is perferably of the multistage centrifugal type and is connected to be driven by the gas turbine or other expansion engine 9.

By the arrangement hereinbefore referred to and hereinafter discussed in more detail, the turbine 9 is made to produce sufficient power so that the gas entering the compressor 16 may be compressed to such extent as may be desired as, for example, to a pressure greater than the pressure at which it was originally produced, for the purpose of injecting it again into the formation. In such event, it may be assumed that the residue gas would be compressed in the compressor 16 to some pressure such as 3000 p. s. i. and that it would emerge from the compressor at a temperature in the neighborhood of 200° F. From the compressor such compressed gas may be conducted through a suitable line 17 to an injection well 18.

The power available for driving the turbine 9 will, of course, depend upon the amount of heat added to the mixture flowing into the turbine. Inasmuch as for reasons hereinbefore stated, the amount of heat which can be added by the exchanger 5 and furnace 7 to the gaseous mixture leaving the separator 2 is limited and for practical purposes will at least in many cases be insufficient to produce the required power in the turbine 9, this invention provides a means whereby a greater amount of heat energy may be made available for conversion into mechanical energy in the turbine 9.

Thus this invention provides for the separation of a portion of the heavier constituents of the gaseous mixture flowing through the separator 12 and for the conduct of such portion, which is in liquid form, through the line 19 to the pump 20, by which pump the liquid is forced to flow through the line 21 and the control valve 22 into the line 4 to be mingled with the stream of gaseous mixture flowing from the separator 2 into the heat exchanger 5.

The retrograde pressure range for natural gases is the range above the pressure at which the liquid content of the vapor phase is at a minimum. This pressure is variable somewhat depending upon the exact constituency of the mixture but is ordinarily of the order of 800 p. s. i. Below this pressure the gas volume is correspondingly greater and allows the liquid more room into which to evaporate. Above this pressure the predominant factor is the density of the gas phase which causes it to have characteristics of a liquid and it takes up or "dissolves" the liquid in increasing amounts with increasing pressures.

Inasmuch as there has been described a process in which the incoming stream of gases has been expanded from 1950 p. s. i. to 1050 p. s. i. by passing it through the turbine 9, and this reduction in pressure is in the retrograde range so that the expansion has reduced the tendency of the liquid constituents to remain in the vapor phase and has thus increased the temperature at which the liquid may be recovered in the separator 12 to a point considerably above that at which it could have been recovered in the separator 2, the matter of recovering liquid in the separator 12 is facilitated.

The injection of the liquid mixture which is of the same nature (hydrocarbon) as the gaseous mixture to which it is added, serves to augment the volume of gas or vapor passing through the turbine 9.

Another important advantage of this operation in the retrograde condensation range is that it helps balance the heat quantities in the heat exchanger. In the retrograde range the liquid has a greater tendency to enter the vapor phase at higher pressures. Stated differently, at higher pressures the liquid has the same tendency to enter the vapor phase at a lower temperature. Accordingly, the liquid injected into the high pressure gas stream ahead of the heat exchanger 5 will enter the vapor phase over a lower temperature range than the corresponding temperature range at turbine discharge pressure over which the liquid is condensed, thereby affording a temperature difference in heat exchanger 5 to transfer the corresponding latent heat of vaporization.

It is to be noted that inasmuch as the quantity of liquid withdrawn from the separator 12 is identical with the quantity injected into the gaseous stream leaving the separator 2, the composition of the gaseous mixtures leaving the separators 2 and 12 respectively, will be identical. It is further apparent that subject to adequate design of the apparatus as much liquid as desired may be caused to pass through the cycle from the separator 12 through the pump 20 to the stream of gas entering the heating zone. This being true, the amount of heat energy which may be made available for purposes of assisting in the driving of the turbine 9 is unlimited. By maintaining the output of the heater 7 at a substantially constant temperature, the power developed by the turbine may be controlled by utilizing a suitable control valve 22 to control the amount of liquid injected into the line 4. In order to avoid the provision of any prime mover in addition to the turbine 9, the pump 20 is preferably driven also by the turbine 9.

It will be appreciated that the point at which the liquid hydrocarbon is injected into the stream of gas to be heated may be either, as indicated in the drawing, ahead of the heat exchanger 5, or at any other point ahead of the furnace 7.

It will be further appreciated that the stream of liquid hydrocarbons so injected into the gaseous mixture to be heated may be drawn from some suitable source other than the separator 12, such as, for example, from the stream of liquid extracted from the gaseous mixture in the extraction plant.

The use of the cooler 13 between the separator 12 and the extraction plant is desirable in order to insure that the mixture entering the extraction plant will be at a temperature comparable with that at which the gaseous mixture leaves the separator 2, but it is obvious that under some circumstances this cooler 13 may be found unnecessary and, if so, it may of course be omitted.

The liquid extracted from the incoming gas by the separator 2 may be disposed of in any desired manner such as by being conducted through a pipe line 3 to a point where it is injected into and mixed with the stream of products entering the extraction plant as illustrated in the drawing.

From the foregoing it will be appreciated that a method and apparatus have been provided for carrying out all of the objects of this invention.

This application is, in part, a continuation of my prior co-pending application, Serial Number 569,758, filed December 26, 1944, for Treatment of Gaseous Mixtures, now abandoned.

The invention having been described, what is claimed is:

1. In a method of treating a gaseous mixture containing a desirable liquefiable hydrocarbon fraction produced from an earth reservoir containing same at temperature and pressure conditions within a range such that the mixture can undergo retrograde condensation, which method comprises heating the mixture to a temperature less than its decomposition temperature to add to its energy content, expanding the mixture within said range while causing it to do mechanical work, recovering from the mixture the desired liquefiable hydrocarbon fraction, and utilizing the mechanical work to recompress the residue of the mixture to a pressure greater than that at which it was originally produced, the improvement which comprises injecting into the mixture about to be heated a quantity of a liquefiable hydrocarbon fraction in liquid form having gas dissolved therein to independently control the permissible energy content which may be added by heating without raising the temperature to the decomposition temperature of the mixture.

2. The method set forth in claim 1 wherein the liquefiable hydrocarbon fraction injected into the gaseous mixture is obtained from previously processed gaseous mixture from the same source.

3. The method set forth in claim 1 wherein the temperature of the heated gas previous to expansion is maintained substantially constant and the quantity of liquid injected is independently regulated to control the amount of energy expended in the expansion step.

4. In a method of treating a gaseous mixture containing a desirable liquefiable fraction which method comprises passing said mixture at a substantially constant rate to a heating zone, heating the mixture while at a substantially constant pressure to a temperature less than its decomposition temperature, expanding the heated mixture while causing it to do mechanical work, separating the desired liquefiable fraction from the mixture leaving a residue gas, the improvement which comprises increasing the available mechanical work from the expansion step by injecting into the gaseous mixture about to be heated independently of the rate of flow thereof a quantity of a liquid fraction of the nature recovered from said gaseous mixture and controlling the amount of said liquid injected to yield the desired amount of mechanical work from the expansion step.

5. An apparatus for recovering liquid hydrocarbons from a gaseous mixture produced from an earth reservoir containing the same at high pressure, said apparatus comprising means for injecting a hydrocarbon liquid containing dissolved hydrocarbon gas into a stream of such mixture; means for heating said mixture including the constituents injected as a liquid to liberate from solution the gas dissolved therein, vaporize said liquid and increase the volume of such mixture; means for expanding the thus heated mixture while said mixture does mechanical work; means for cooling the expanded mixture to condense hydrocarbon liquid therefrom a part of the cooling means comprising indirect heat exchange means for passing the expanded mixture in indirect heat exchange with said mixture being heated; means for separating said cooled and expanded mixture into a liquid portion to be recovered together with any gaseous constituents dissolved therein, and a residual gas; means driven by said means for expanding so that said work is employed for recompressing said residual gas to a pressure great enough to reinject said residual gas into said reservoir; means for conducting said residual gas back to said earth formation; and means for conducting a part of said separated liquid portion with its dissolved gas to said means for injecting to supply the same with hydrocarbon liquid containing dissolved hydrocarbon gas for injection into the incoming stream of mixture.

6. The method of treating a gaseous mixture containing a liquefiable hydrocarbon fraction produced from an earth reservoir containing the same at a pressure above the lower limit of the retrograde condensation range for the mixture, comprising passing the mixture at a substantially constant rate to an injecting zone, injecting into such mixture while within such range and independently of the rate of flow thereof from a lower pressure a hydrocarbon liquid containing dissolved hydrocarbon gas; heating the mixture, including the constituents injected as a liquid to liberate from the solution the dissolved hydrocarbon gas, vaporize the hydrocarbon liquid, and increase the volume of the gaseous mixture; expanding the thus heated mixture while said mixture does mechanical work; cooling the expanded mixture to produce an amount of hydrocarbons in liquid phase not less than the amount injected before heating; separating said hydrocarbons in liquid phase together with hydrocarbon gases dissolved therein from the mixture; using a part of said separated liquid hydrocarbons with the gases dissolved therein for said injection into the incoming gaseous mixture, and controlling the amount of said liquid injected to yield the desired amount of mechanical work from the expansion step.

7. An apparatus for recovering liquid hydrocarbons from a gaseous mixture produced from an earth reservoir containing the same at high pressure, said apparatus comprising means for receiving said gaseous mixture from the earth reservoir, means connected to said receiving means for injecting a hydrocarbon liquid containing dissolved hydrocarbon gas into a stream of such mixture flowing through said receiving means, a heater connected to said receiving means for receiving said mixture together with the constituents injected into same as a liquid and heating said mixture and constituents to liberate from solution the gas dissolved therein, vaporize said liquid, and increase the volume of such mixture, an expansion engine connected to said heating means for receiving the thus heated mixture and expanding same while said mixture does mechanical work, a cooler connected to said expansion engine for receiving the expanded mixture and for cooling the same to condense hydrocarbon liquid therefrom, said cooler also being connected between said heater and said receiving means so that the expanded mixture can be in indirect heat exchange with the mixture flowing from the receiving means, a separator connected to said cooler for receiving and separating said cooled and expanded mixture into a liquid portion to be recovered together with any gaseous constituents dissolved therein, and a residual gas, a compressor connected to said expansion engine to be driven thereby and to said separator to receive said residual gas from said separator and to compress the same to a pressure great enough to reinject said residual gas into said earth reservoir, a conduit connected to said compressor for conducting said residual gas back to said earth reservoir, and a conduit connected to said separator and to said injecting means for receiving a part of said separated liquid portion with its dissolved gas and conducting same to said injecting means to supply the injecting means with hydrocarbon liquid containing dissolved hydrocarbon gas for injection into the incoming stream mixture.

8. A method for converting heat energy into power which comprises injecting a liquid containing dissolved gas into a gas to form a mixture having the property of undergoing retrograde condensation within a range of suitable temperature and pressure conditions, heating the resulting mixture to liberate the dissolved gas from solution, vaporize the liquid and increase its volume while maintaining a pressure within said range of pressure conditions; expanding the thus heated mixture while causing it to do mechanical work;

cooling the expanded heated mixture to a temperature sufficiently low to liquefy the injected liquid, at least a portion of said cooling being by indirect heat exchange with the mixture being heated; separating the thus produced liquid from the cooled mixture and using at least a part of the separated liquid as the liquid injected into said gas.

9. In a method for recovering a liquefiable hydrocarbon from a natural gas derived from a source at a pressure above the lower limit of the retrograde condensation range for the natural gas wherein the natural gas is heated to an elevated temperature less than the decomposition temperature of its components and expanded in an expansion step to a lower pressure to do mechanical work, said lower pressure being within a range in which at a suitable temperature a liquid will be condensed as a result of an isothermal expansion to said lower pressure, and wherein said liquefiable hydrocarbon is recovered in a recovery zone from the expanded gas and the resulting denuded gas compressed to a pressure at least as high as its original pressure by utilization of said mechanical work, the improvement which comprises injecting into said gas prior to its heating a liquid hydrocarbon saturated with a normally gaseous hydrocarbon to increase the available energy content which can be added by heating without raising the temperature to the decomposition temperature, the amount of said injected hydrocarbon being sufficient to insure enough energy from the expansion step for the desired compression of the denuded gas, independently of the rate of flow of natural gas feed, and preheating the resulting mixture of natural gas and liquid hydrocarbon by indirect heat exchange with the expanded gaseous mixture of injected hydrocarbon and natural gas after mechanical work has been done thereby, the mixture being preheated and the expanded mixture both being maintained at suitable pressures such that by retrograde condensation a liquid in the expanded mixture can be condensed at a temperature higher than that at which it is vaporized in the mixture being preheated.

10. The method of claim 9 wherein the expanded mixture after the preheating step is further cooled to a temperature sufficiently low to provide a gaseous portion and a volume of hydrocarbon condensate equal to the volume of the injected hydrocarbon liquid and wherein this condensate is employed as the injected hydrocarbon whereby the composition of said gaseous portion is substantially the same as the natural gas feed.

11. In a method of treating a gaseous mixture containing a liquefiable fraction which method comprises passing the mixture to a heating zone at a substantially constant rate, heating the mixture to a temperature less than its decomposition temperature, expanding the heated mixture while causing it to do mechanical work, recovering a liquid from the expanded mixture, the improvement which comprises injecting a liquid of the nature recovered from said expanded mixture into said mixture before the same is heated, said liquid being vaporizable under the conditions at which said heating occurs, and controlling the amount of said liquid injected to yield the desired amount of mechanical work from the expansion step independently of the rate of flow of said mixture to said heating step.

JUDSON S. SWEARINGEN.

REFERENCES CITED

The following references are of record in the file of this patent:

UNITED STATES PATENTS

| Number | Name | Date |
|---|---|---|
| 1,015,777 | Bradley | Jan. 30, 1912 |
| 1,809,409 | Granger | June 9, 1931 |
| 2,104,327 | Kotzebue | Jan. 4, 1938 |
| 2,151,248 | Vaughan | Mar. 21, 1939 |
| 2,215,497 | Doczekal | Sept. 24, 1940 |
| 2,355,167 | Keith | Aug. 8, 1944 |